United States Patent Office 2,781,310
Patented Feb. 12, 1957

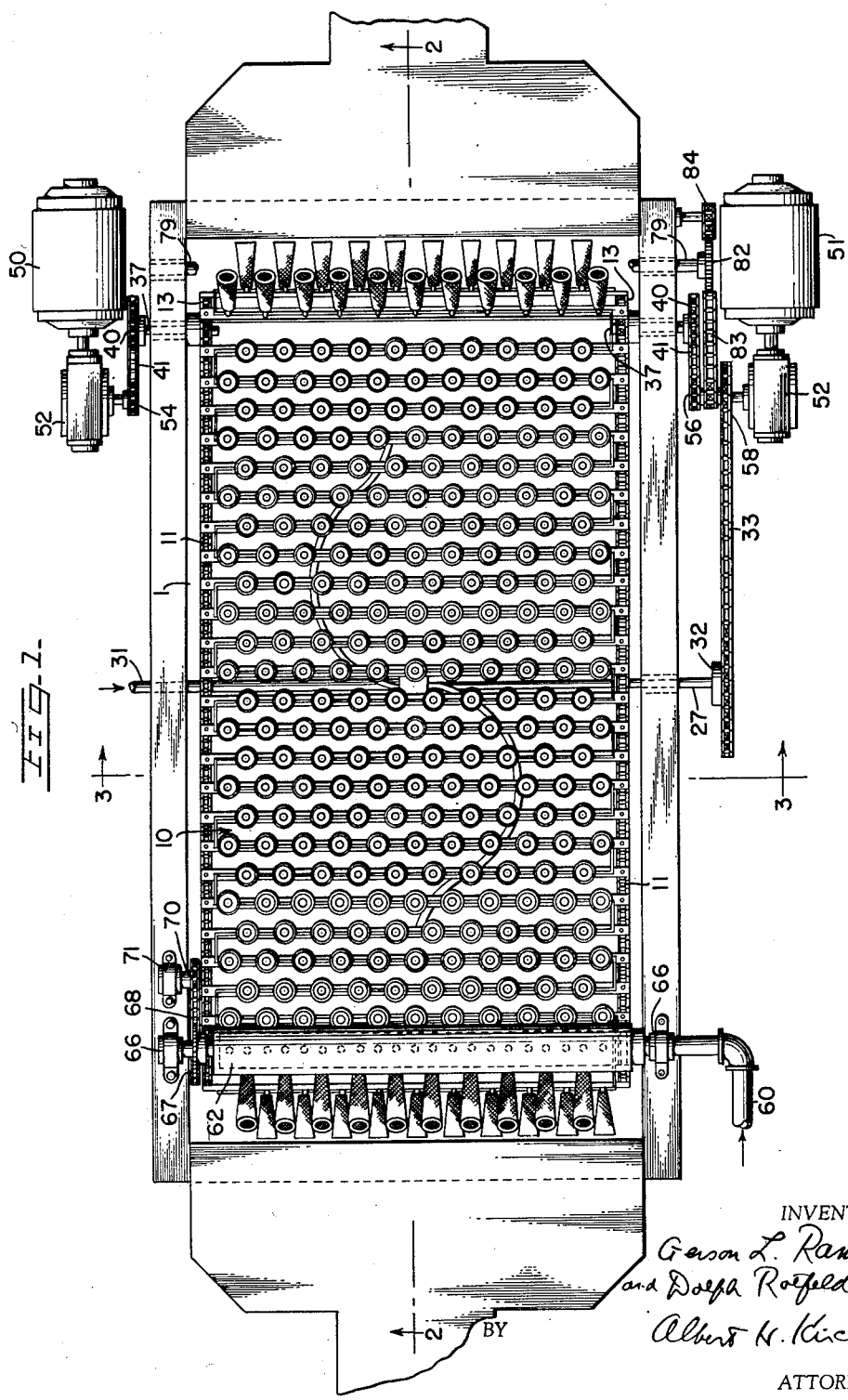

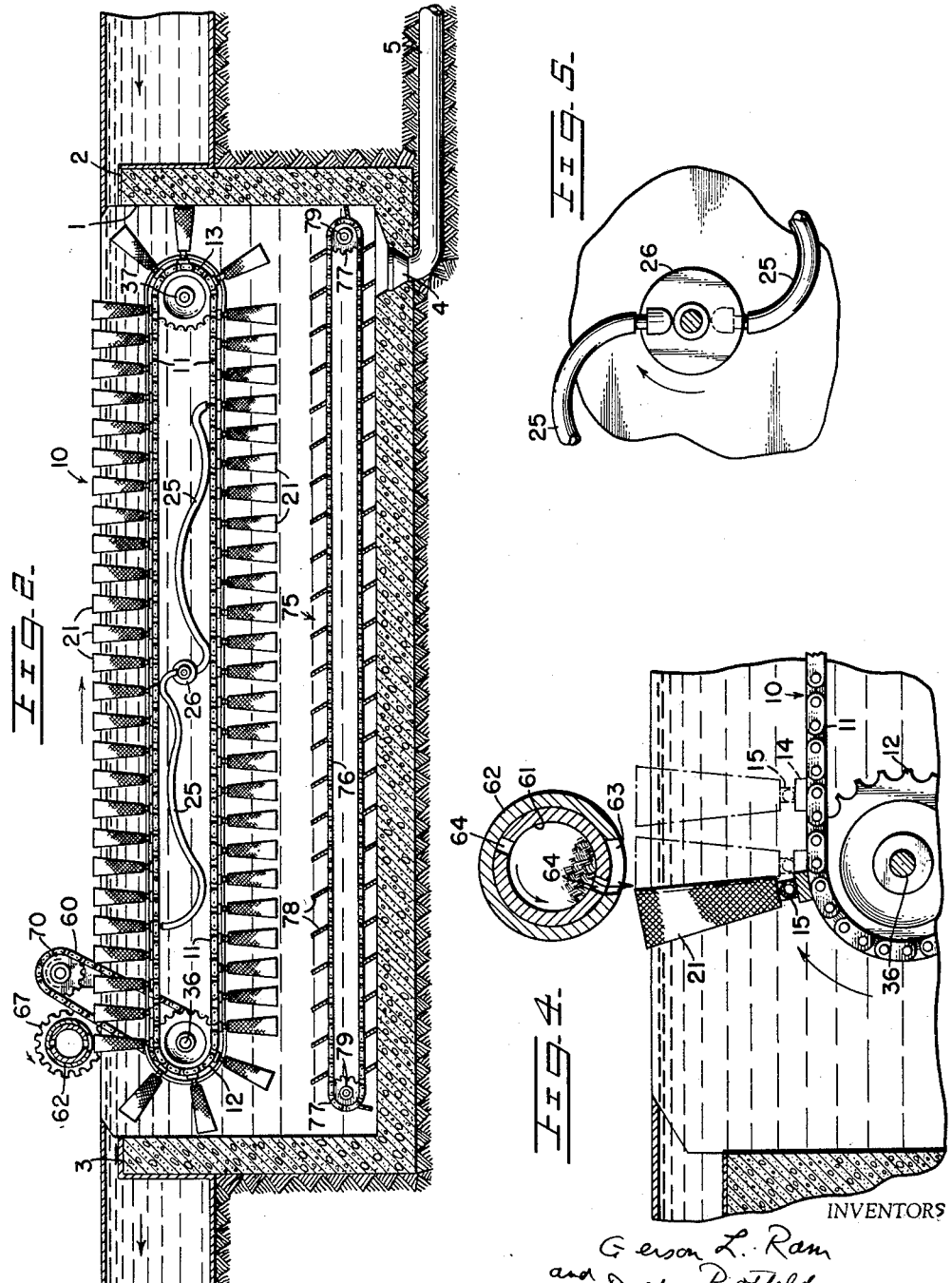

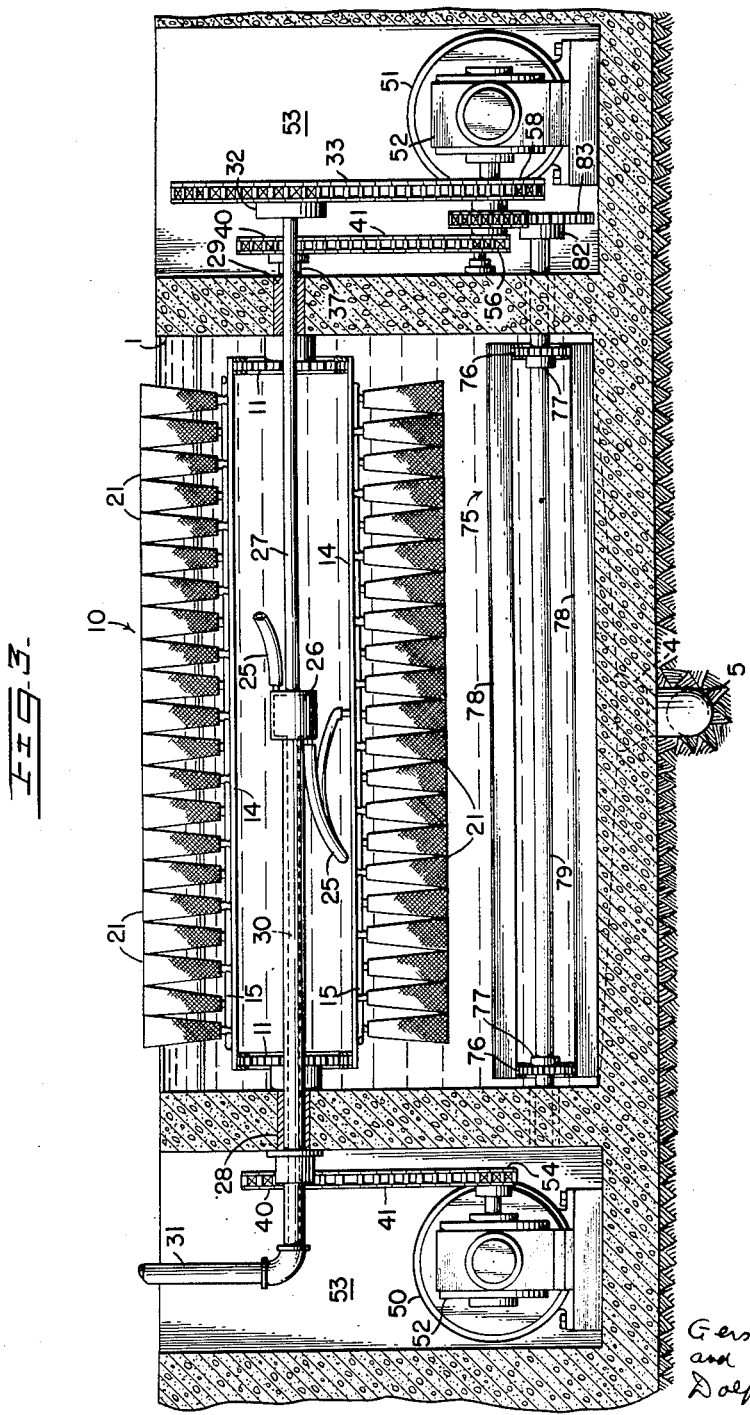

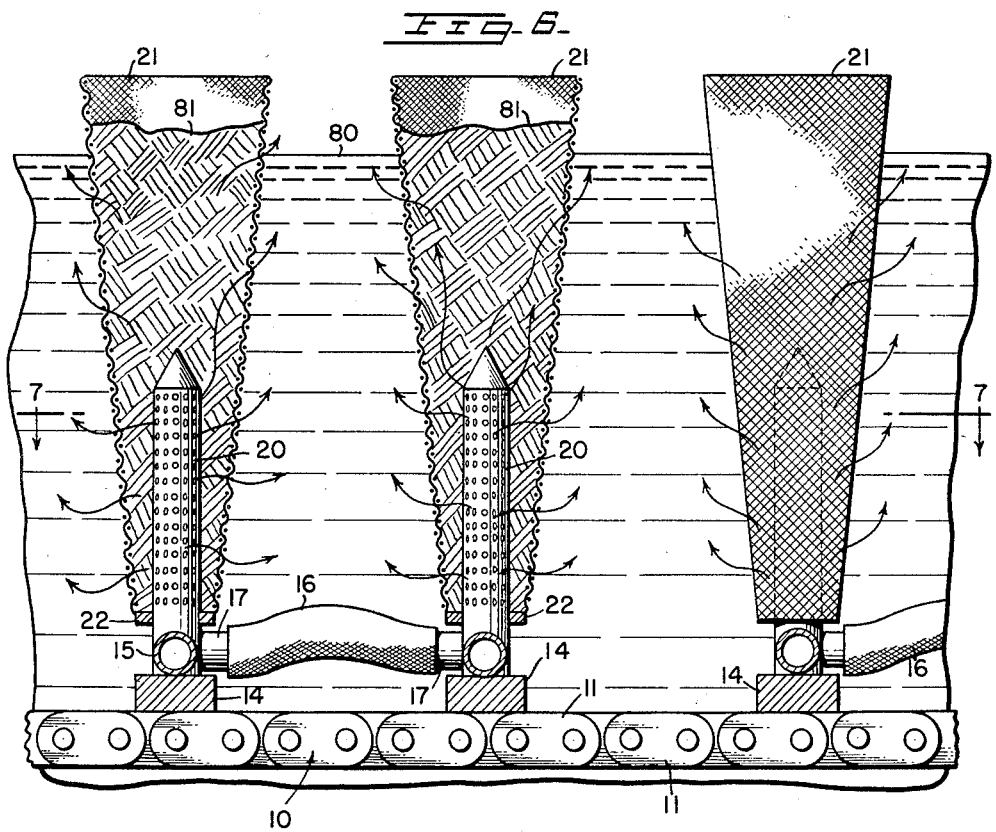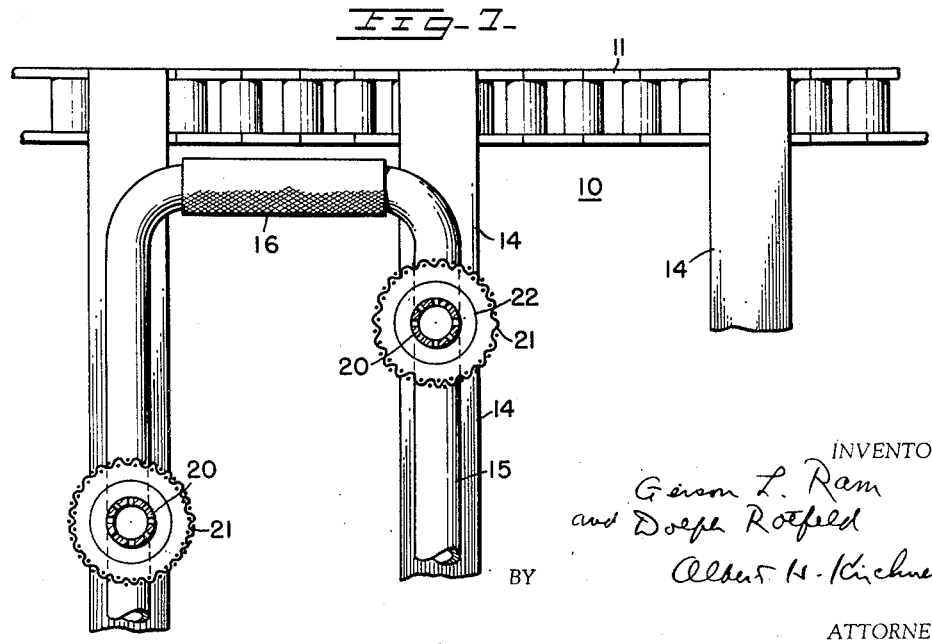

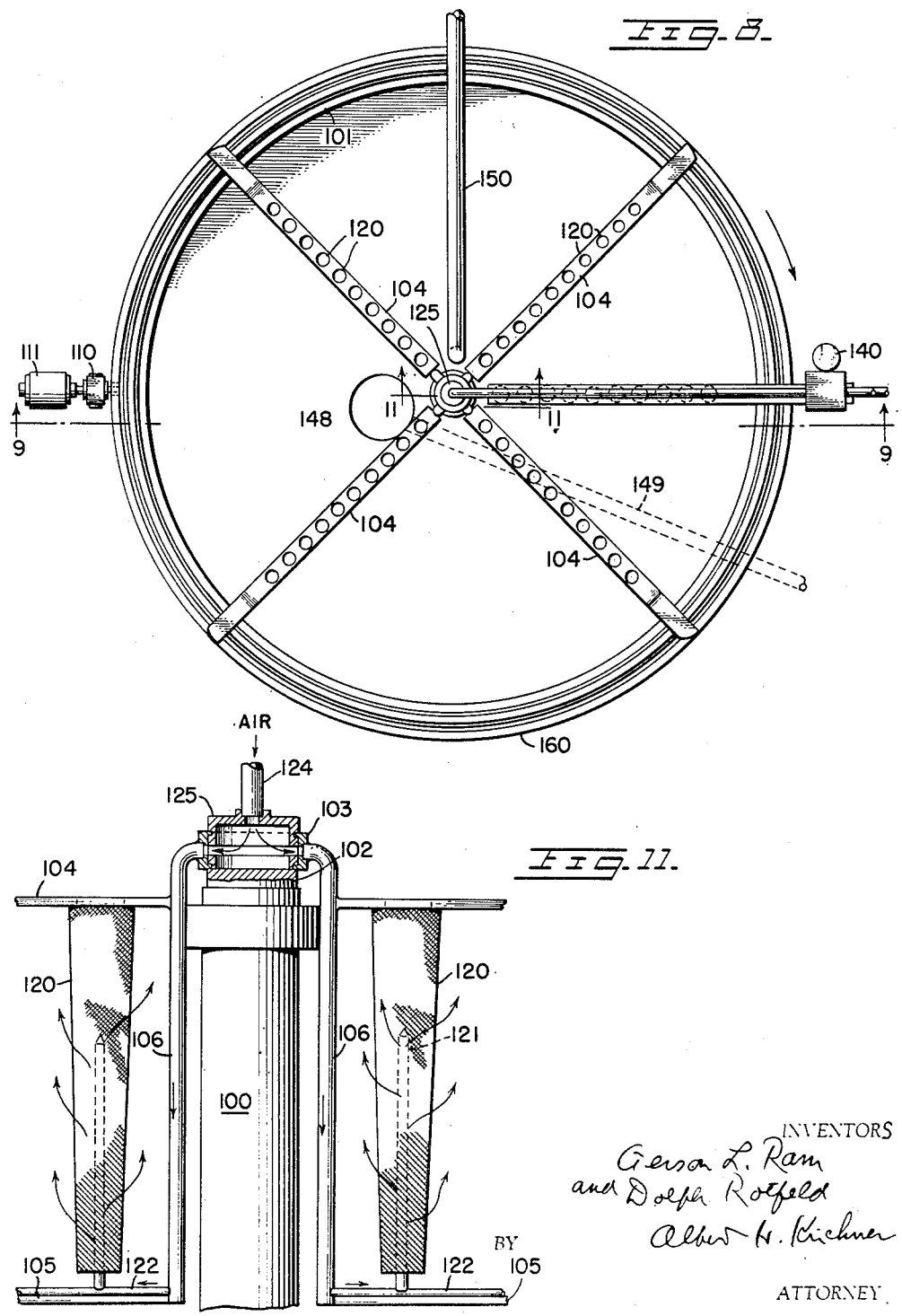

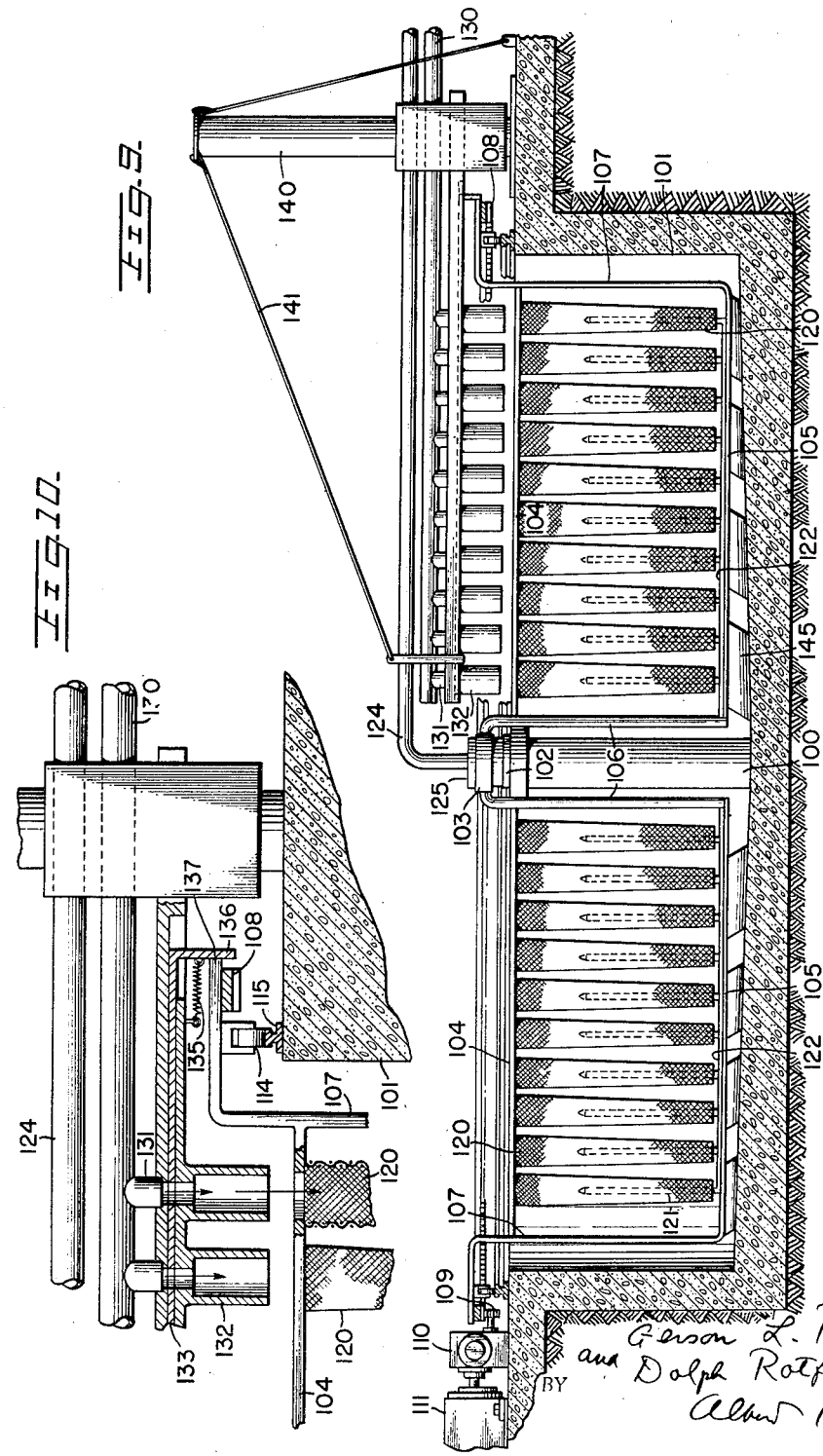

2,781,310

SEWAGE TREATMENT APPARATUS AND METHOD

Gerson L. Ram, Bloomfield, N. J., and Dolph Roffeld, New York, N. Y.

Application February 6, 1956, Serial No. 563,708

9 Claims. (Cl. 210—2)

This application is a continuation-in-part of our co-pending application Serial No. 354,254, filed May 11, 1953 now abandoned.

The invention relates to sewage treatment apparatus and a method of treating sewage by activated sludge or zoogloea for the purpose of oxidizing putrescible material, and the principal object of the invention is to produce improved oxygenation of treating-quantities of sludge, hereinafter called floc, and more intimate, complete and effective treatment of the sewage with the floc.

More specific objects are concerned with providing apparatus operating in a tank for moving through a quantity of raw sewage contained in the tank discrete bodies of floc consisting of concentrations of aerobic bacteria, supplying copious quantities of air to the floc during such movement, and thereafter dumping the thus highly activated sludge into the sewage for permeation through it and eventual settlement, removal and reuse in part.

Particular advantages of the invention include increased rapidity of the purification process, adaptability of the principles of the method and apparatus construction to tanks of circular or rectangular shape for either continuous or batch operation, and low cost of construction and installation as well as operation and maintenance.

Other objects and advantages of the invention will be apparent to those skilled in the art from the following description of certain preferred embodiments of the inventive principles that are illustrated in the accompanying drawings, in which Figure 1 is a top plan view of a form of the invention adapted for installation in a tank of rectangular shape;

Fig. 2 is a longitudinal sectional view on the line 2—2 of Fig. 1;

Fig. 3 is a transverse sectional view on the line 3—3 of Fig. 1;

Fig. 4 is a relatively enlarged detail vertical sectional view showing the floc supplying means in the lefthand portion of Fig. 2;

Fig. 5 is a similarly enlarged detail vertical sectional view showing a portion of the air supplying means in the central area of Fig. 2;

Fig. 6 is a still further enlarged detail sectional view showing a group of floc containers in upright position on the upper run of the conveyer;

Fig. 7 is a horizontal sectional view taken on the line 7—7 of Fig. 6;

Fig. 8 is a top plan view of a form of the invention adapted for installation in a tank of circular shape;

Fig. 9 is a vertical diametric sectional view on the line 9—9 of Fig. 8;

Fig. 10 is a relatively enlarged detail vertical sectional view showing the floc supplying means in the righthand portion of Fig. 9; and Fig. 11 is a similarly enlarged detail vertical sectional view on the line 11—11 of Fig. 8.

In the rectangular tank embodiment shown in Figs. 1-7 the reference numeral 1 designates a masonry or other appropriately waterproofed large enclosure which may be wholly above grade or partially depressed as shown, provided at one end with an inlet weir 2 for the entrance of raw, settled or partially treated sewage and having at its opposite end an outlet weir 3 for the discharge of effluent. Extending across the bottom of the tank, adjacent the inlet end, is a sump 4 for receiving settled floc, and communicating with this sump is a floc discharge conduit 5 to which may be connected a pump for removing floc from the sump.

The tank contains a multiplicity of relatively small receptacles for receiving, containing and moving quantities of sludge through an upper zone of the tank contents while the quantities of sludge are being aerated, and then liberating the sludge slowly and gradually into an intermediate zone of the tank contents for slow settlement into the lower zone and ultimate movement to the sump and discharge conduit.

Convenient apparatus for constituting the foregoing means, as shown in Figs. 1-7, may comprise an endless conveyer generally designated 10 extending substantially the entire length and width of the tank and mounted in the upper zone of the tank. The conveyer in the preferred form shown in the drawing comprises a pair of endless chains 11, 11, each extending along a lengthwise side of the tank and trained over a head sprocket 12 and a tail sprocket 13. Cross slats 14 connect the chains at closely spaced intervals, and on the top of each slat is mounted a tube 15 extending the full length of the slat. All the tubes of all the slats are connected in series by short flexible hose lengths 16 slipped over nipples at alternate ends of the tubes, as best appears in Figs. 6 and 7 considered in combination with Fig. 1.

Upstanding from each of the tubes 15, at closely spaced intervals along the entire length of the tube, are a plurality of short diffuser tips 20, each provided with a multiplicity of small orifices, and surrounding each diffuser tip is a receptacle 21, preferably of inverted truncated cone shape, mounted on a base 22 and rising well above the top of the tip and having a completely pervious side wall, preferably made of small mesh wire screen.

Two of the cross tubes 15 which are connected with each other on opposite sides of each by chain sections of equal length are connected by flexible hoses 25 with a manifold 26 mounted at the longitudinal and transverse center of the conveyer on a transverse shaft 27 which projects at its opposite ends through bearings 28, 29 in the tank side walls. A hollow bore 30 running one-half of the shaft length communicates with an air supply pipe 31 outside one side wall of the tank, and the opposite end of the shaft, projecting through the other side wall of the tank, carries a drive sprocket 32 over which is trained a chain 33 for rotation of the shaft as will be hereinafter explained.

The chains 11 are mounted in the tank by a stub shaft 36 for each of the head sprockets 12, and a stub shaft 37 for each of the tail sprockets 13. These stub shafts are journaled in bearings in the tank side walls, and each of the tail sprocket stub shafts 37 has mounted on its outer end a drive sprocket 40 over which is trained a chain 41.

To drive the sprocket 32 of the air-supply manifold shaft 27 and the sprockets 40 of the conveyer stub shafts 37, it is convenient to provide electric motors 50 and 51, each having a similar speed reducer 52, in similar wells 53 at opposite sides of the tank at the tail end of the conveyer. The motor 50, in the lefthand well 53 as viewed in Fig. 3, has its speed reducer sprocketed at 54 to the chain 41, thus driving the stub shaft 37 which appears in the upper portion of Fig. 1. The similar stub shaft 37 which appears in the lower portion of Fig. 1 is driven from the motor 51 and its speed reducer 52 which appear in the lower part of Fig. 1 and the righthand side of Fig. 3 by a sprocket 56 over which is trained the chain 41 for this stub shaft 37. A sprocket 58 on the same speed reducer drive shaft drives the chain 33 for turning the sprocket 32 and thus rotating the air supply shaft 27.

The motors are synchronized so that the stub shafts 37 are rotated at identical speeds, and the ratio of the sprockets 58 and 32 to the sprockets 54 and 40 (and to the identically related sprockets 56 and 40) is such that the air supply shaft 27 will make one complete rotation on each full revolution of the conveyor. Thus the hose connections 25 are subjected to no strain as the slack condition in which they are shown in Fig. 2 increases and decreases with movement of their outlet ends toward and away from their inlet ends at the manifold 26. As will be evident from the arrangement of the gearing, the stub shafts 37 and the air supply shaft 27 rotate in the same direction, which may be regarded as clockwise as viewed in Fig. 2.

The function of the receptacles 21 is to receive a quantity of sludge at the beginning of their movement in upright position through the tank, and for this purpose the construction includes a floc supply means such as the one best shown in Fig. 4 and at the lefthand ends of Figs. 1 and 2. This preferred form includes a supply pipe 60 which feeds a hollow shaft 61 rotatably mounted in a fixed outer tube 62 extending transversely across the top of the tank, directly above the axis of the head sprocket stub shafts 36. The tube 62 has a line of perforations 63 in its bottom, each perforation directly overlying the path along which one of the receptacles 21 moves, and each perforation being longer in the direction of that path than it is wide. That is to say, each perforation is a slot extending some 20 to 25 degrees more or less around the peripheral curvature of the tube and if, as is preferred, the receptacles of successive transverse slats 14 are staggered (see Fig. 1), the number of perforations 63 is equal to the number of receptacles carried by each pair of adjacent slats (twenty-one in the illustrated embodiment).

The inner hollow shaft 61 is provided with two diametrically opposite series of perforations 64. The number in one series is that of the receptacles on one of the slats, and the number in the other series is that of the receptacles on the next adjacent slat, and each of the perforations 64 is located in the vertical plane in which one of the receptacles moves. The arrangement is such that if the hollow shaft 61 be rotated counterclockwise at proper speed relative to the speed at which the receptacles 21 are moved by clockwise rotation of the stub shafts 37 and 36, a perforation 64 will move along its subjacent fixed perforation 63, from left to right in Fig. 4, during the entire time that the open mouth of a receptacle 21 is moving within the plan projection of the perforation 63. If the hollow shaft 61 contains sludge under pressure, it will be obvious that each of the receptacles will receive a charge of sludge, squirted through the momentarily registering apertures 64 and 63, during its short traverse of the zone beneath the tube 62 at the very beginning of its movement in upright position along the upper run of the conveyor chains.

Sludge is supplied to the pipe 60 under pumping or other pressure, and the hollow shaft 61, suitably journaled in bearings 66 mounted on the tank side walls, is rotated by a drive sprocket 67 engaged by a chain 68 which is trained over a sprocket on the stub shaft 36 of one of the head sprockets 12 and an idler sprocket 70 which is mounted on a bracket 71 on the tank wall. It will be appreciated that this arrangement, for which of course any suitable equivalent gearing could be substituted, results in turning the hollow shaft 61 from the same drive as stub shafts 36 and 37 but in the opposite direction.

To remove settled sludge from the tank, the installation may include the scraper means 75 best shown in Figs. 2 and 3. This is essentially a conveyer structure including endless chains 76 at opposite sides of the tank bottom, trained over sprockets 77 at the tank ends and connected by transverse scraper blades 78. The sprockets are fast on shafts 79, the one at the inlet end of the tank extending through one of the tank side walls into the well 53 at the righthand side of the tank as viewed in Fig. 3. On the end of this shaft is a sprocket 82 which is driven by a chain 83 that is trained over an idler sprocket 84 and a drive sprocket on the driving or output shaft of the speed reducer 52 of the adjacent motor 51. Thus the scraper drive shaft 79 is rotated counterclockwise as viewed in Fig. 2 so that the bottom run of the scraper means 75 moves from left to right in Fig. 2, with the blades 78 in contact or substantial contact with the tank bottom and thus moving precipitated, settled sludge to the sump 4, for discharge through the pump-connected conduit 5.

It is believed that the operation of the system thus constructed, and the treatment method practiced by such operation, will be evident from the foregoing description. It may be briefly explained that, with air supplied under pressure to the pipe 31, with sludge supplied under pressure to the pipe 60 (comprising a portion, say 25%, of that which is removed from the sump 4), with the motors 50 and 51 in operation, and with raw or partially raw sewage entering the tank from the weir 2, the operation is as follows:

The contents of the tank stand at about the level 80 in Fig. 6, which is preferably slightly below the level of the tops of the receptacles 21 in the upper run of the conveyor 10. The sewage flows slowly toward the discharge weir 3. Successive rows of receptacles 21 rise about the axis of the stub shafts 36 adjacent the discharge weir and, promply on attaining upright position, are filled with sludge or floc to about the level 81. Thus filled the receptacles start their slow traverse of the tank, toward the inlet weir, moving countercurrent to the sewage. At the same time air is bubbling from the diffuser tips 20 for thoroughly supplying the aerobic bacteria of the sludge. This air, together with some of the floc, passes through the mesh walls of the receptacles and into the sewage. At the end of the upper run of the conveyor, the receptacles turn down to inverted position for return and refilling, and thus dump their contents, or the remainder of their contents, into the intermediate zone of the sewage. Sludge settles to the bottom of the tank and is removed by the scraper mechanism to the sump 4 and thence by a pump (not shown) through the conduit 5, partly for reuse via the pipe 60 and partly for disposition as a solid or semi-solid product of the treatment process. Clear effluent from the tank passes over the weir 3.

Substantially the same method is practiced in the operation of the circular tank embodiment of the invention shown in Figs. 8–11. A stout post 100 is mounted in the center of a depressed circular tank 101 of concrete or the like and is surmounted by a bearing structure 102 for a rotatable collector ring 103 comprising the hub of a framework made up of a plurality of horizontally radiating upper arms 104 and vertically aligned and registering lower arms 105. Each of the upper and lower sets of arms may comprise four arms in number, as shown in the illustrated embodiment. Each registering pair of upper and lower arms may be connected in any suitable way to provide a rigid assembly, as by the inner pipes 106 and the outer rods 107. At their upper ends the outer rods are directed radially outwardly to terminate in a welded connection to a rigid ring 108 which is provided with teeth on its under surface so as to function as a circular rack and be driven by the pinion 109 of a speed reducer 110 coupled to an electric motor 111 positioned on the ground at a side of the tank 101. Rollers 114 may be mounted on the under side of the rods 107 just inwardly of the ring 108 for riding on a circular rail 115 disposed around the edge of the tank to provide support for the framework in its slow rotation around the central post 100.

Mounted on each aligned pair of upper and lower arms 104 and 105 is a series of upright receptacles 120, each made of wire screen generally like the receptacles 21 of the previously described embodiment of the invention. Each of these receptacles 120 has its top open through an opening in the upper arm 104 and has its bottom supported by the arm 105. A perforated diffuser tip 121 extends upwardly part of the height of each receptacle and is connected with one of the inner pipes 106 by a radiating branch pipe 122 lying along and supported on the lower arm 105. An air supply main 124 conveys air under pressure to a cap 125 on the post 100 above the bearing structure 102 and thence the air flows through the pipes 106 and 122 to issue from the diffusing orifices in the tips 121.

Floc is supplied to the receptacles 120 from a fixed pipe 130 which projects radially inwardly from a point on the side of the tank slightly above the level of the top of the tank side wall. A series of openings in the under side of this pipe 130, one for each of the receptacles 120, communicate through short nipples 131 with spouts 132, with a ported valve plate 133 intervening, as best shown in Fig. 10. The valve plate is slideable lengthwise, i. e., radially of the tank, and is normally maintained retracted by a spring 135 to keep the valves closed so that the spouts 132 are closed off from the nipples 131. The valves are opened, however, by a finger 136 which depends from the outer end of the plate 133 and becomes engaged by a cam enlargement 137 on the outer end of each of the upper arms 104. Thus the valves are opened as the arms pass beneath them and are maintained closed at all other times.

Support for the inner end of the assembly of pipe 130 and its dependent structure may be provided by a side mast 140 and tie wire 141 as shown in Fig. 9.

Scraper blades 145 are fastened to the lower edges of the lower arms 105, preferably in overlapping staggered relationship and are in contact or substantial contact with the tank bottom so as to tend to move toward the center of the tank in a gradually shortening spiral path all precipitation or sediment from the tank contents. Adjacent the tank center is provided a sump 148 from which leads a conduit 149 to a pump or equivalent means for removing sediment, as will be understood.

In operation the tank 101 is filled with raw or partially raw sewage delivered in any convenient manner to the central portion of the tank. This may be accomplished by any suitable trough, such as that shown at 150 in Fig. 8. Alternatively a supply trough or pipe might be supported by the mast 140 and tie wire 141, or the central post 100 could be formed with a bore and a discharge opening or set of openings in its upper portion. The tank is filled to a level slightly below the upper arms 104; air is supplied through the pipe 124 and floc is delivered through the pipe 130. The motor 111 is started, thus slowly rotating the arm framework to bring the receptacles 120 successively beneath the spouts 132 which discharge floc into the containers as the valves in the plate 133 are opened by engagement of the end enlargements 137 with the finger 136. As the thus filled receptacles continue their slow circular movement through the tank, air bubbles through them, thoroughly aerating the sludge in them and liberating the aerated sludge through the mesh of the receptacles and into the body of sewage in the tank. The various values of rotational speed, pressure and amount of air, and quantity of floc supplied, may be regulated so as to cause the receptacles to be substantially emptied by the time they have completed a full rotation. They are then refilled and the cycle is repated.

Effluent may be discharged over an outlet weir 160 located at some convenient point on the tank periphery. Settled sludge is moved by the scrapers 145 to the sump 148 and withdrawn through the conduit 149 for any appropriate disposition, including diversion of some portion, say 25%, for reuse in the receptacles 120.

It is to be understood that the two embodiments of the inventive principles which have been used hereinabove to illustrate the type of apparatus provided by the invention and capable of being employed in practicing the method steps in which the invention consists are given by way of example merely, and not by way of limitation. The principles of the invention may be embodied in other and further modified forms, all of which are to be deemed within the scope and purview of the broader of the appended claims.

We claim:

1. Sewage treatment apparatus comprising a tank for containing raw or settled sewage, a plurality of open topped receptacles disposed in the tank, means for moving said receptacles in an endless path through the sewage in the tank, supply means positioned above a portion of said path for dropping sludge into said receptacles as they pass successively below said supply means, and means for blowing air through sludge in the receptacles.

2. Sewage treatment apparatus comprising a tank for containing raw or settled sewage, a plurality of open topped receptacles arranged in straight line rows in the tank, supply means disposed above the tank and including a plurality of ports arranged in a straight line, means moving the receptacles in an endless path through the tank to bring the rows successively into register with the line of supply means ports, means for feeding sludge through said ports into said registering row of receptacles, and means for blowing air through sludge in the receptacles.

3. Sewage treatment apparatus comprising a tank for containing raw or settled sewage, a plurality of open topped receptacles disposed in the tank, means for moving said receptacles in an endless path through the sewage in the tank sludge supply means positioned above a portion of said path and including a plurality of normally closed ports, means automatically responsive to successive positioning of the receptacles directly below said ports for opening the ports to drop a charge of sludge into the receptacles, and means for blowing air through sludge in the receptacles.

4. Sewage treatment apparatus comprising a generally rectangular tank for containing raw or settled sewage, conveyor means in the tank, a plurality of open topped receptacles mounted on said conveyor means for movement in an endless path through the sewage in the tank, sludge supply means positioned above a portion of said path for charging sludge into the receptacles in said portion of the path, and means for blowing air through sludge in the receptacles.

5. Sewage treatment apparatus comprising a generally rectangular tank for containing raw or settled sewage, endless conveyor means horizontally disposed in the tank, a plurality of open topped receptacles mounted on said conveyor means for movement in upper and lower runs through the sewage in the tank, sludge supply means positioned above a portion of the upper run adjacent to an end of said run for charging sludge into the receptacles in the initial portion of said run, and means for blowing air through sludge in the receptacles.

6. Sewage treatment apparatus comprising a generally rectangular tank for containing raw or settled sewage, endless conveyor means horizontally disposed in the tank, a plurality of open topped receptacles mounted in rows transversely on said conveyor means for movement in upright position in an upper run of the conveyor and return in inverted position in a lower run of the conveyor, sludge supply means positioned above a portion of the upper run adjacent to an end of the upper run for charging sludge into the upright receptacles in the initial portion of said run, and means for blowing air through sludge in the receptacles.

7. Sewage treatment apparatus comprising a generally circular tank for containing raw or settled sewage, a rotatable framework including upright means mounted axially of the tank having radiating arms, open topped receptacles carried by said arms, sludge supply means for charging sludge into the receptacles at one radial position in their rotational movement, and means for blowing air through sludge in the receptacles.

8. Sewage treatment apparatus comprising a generally cylindrical tank for containing raw or settled sewage, a rotatable framework including upright means mounted axially of the tank having vertically spaced registering arms radiating toward the tank wall, a line of open topped receptacles supported by each pair of registering arms, sludge supply means disposed above one radial position of each line of receptacles in the rotational movement of the arms, and means for blowing air through sludge in the receptacles.

9. Sewage treatment apparatus comprising a generally circular tank for containing raw or settled sewage, a rotatable framework including upright means mounted axially of the tank having radiating arms, open topped receptacles carried by said arms, sludge supply means including a plurality of normally closed ports disposed over the receptacles at one radial position in their rotational movement, means automatically responsive to positioning an arm directly beneath said ports to open them for discharging sludge into the receptacles on said arm, and means for blowing air through sludge in the receptacles.

References Cited in the file of this patent

UNITED STATES PATENTS

| 1,893,451 | Smith | Jan. 3, 1933 |
| 2,559,704 | Bevan | July 10, 1951 |

FOREIGN PATENTS

| 508,881 | Great Britain | July 7, 1939 |